United States Patent [19]
Bevc et al.

[11] Patent Number: 5,367,916
[45] Date of Patent: Nov. 29, 1994

[54] DRIVE GEAR FOR A MOTOR VEHICLE

[75] Inventors: Jürgen Bevc, Beckum; Heinrich Winkelmann, Jr., Ahlen, both of Germany

[73] Assignee: Winkelmann & Pannhoff GmbH, Westfalen, Germany

[21] Appl. No.: 40,240

[22] Filed: Mar. 30, 1993

[30] Foreign Application Priority Data

Apr. 6, 1992 [DE] Germany ............... 4211472

[51] Int. Cl.⁵ .................. F16H 55/12; F16F 15/22
[52] U.S. Cl. ........................... 74/449; 74/573 R
[58] Field of Search ............ 74/448, 449, 572, 573 F, 74/574, 446, 573 R; 192/3.28

[56] References Cited

U.S. PATENT DOCUMENTS

| | | | |
|---|---|---|---|
| 2,729,110 | 1/1956 | Killian et al. | 74/449 X |
| 4,020,937 | 5/1977 | Winter | 74/572 X |
| 4,305,487 | 12/1981 | Sunohara | 192/3.28 |
| 4,441,594 | 4/1984 | Kubo et al. | 192/3.28 |
| 4,462,269 | 7/1984 | Inglis | 74/572 |

Primary Examiner—David W. Laub
Attorney, Agent, or Firm—Anderson Kill Olick & Oshinsky

[57] ABSTRACT

A drive gear for a motor vehicle including a starter disc having a hub for attachment to a shaft of a vehicle motor for joint rotation therewith, and a drive ring which is supported on the starter disc, is provided with a plurality of holes for connecting the drive ring to a converter of the automatic transmission of the vehicle and has, in the region of the holes, protrusions which engage in corresponding recessed openings formed in the starter disc.

6 Claims, 3 Drawing Sheets

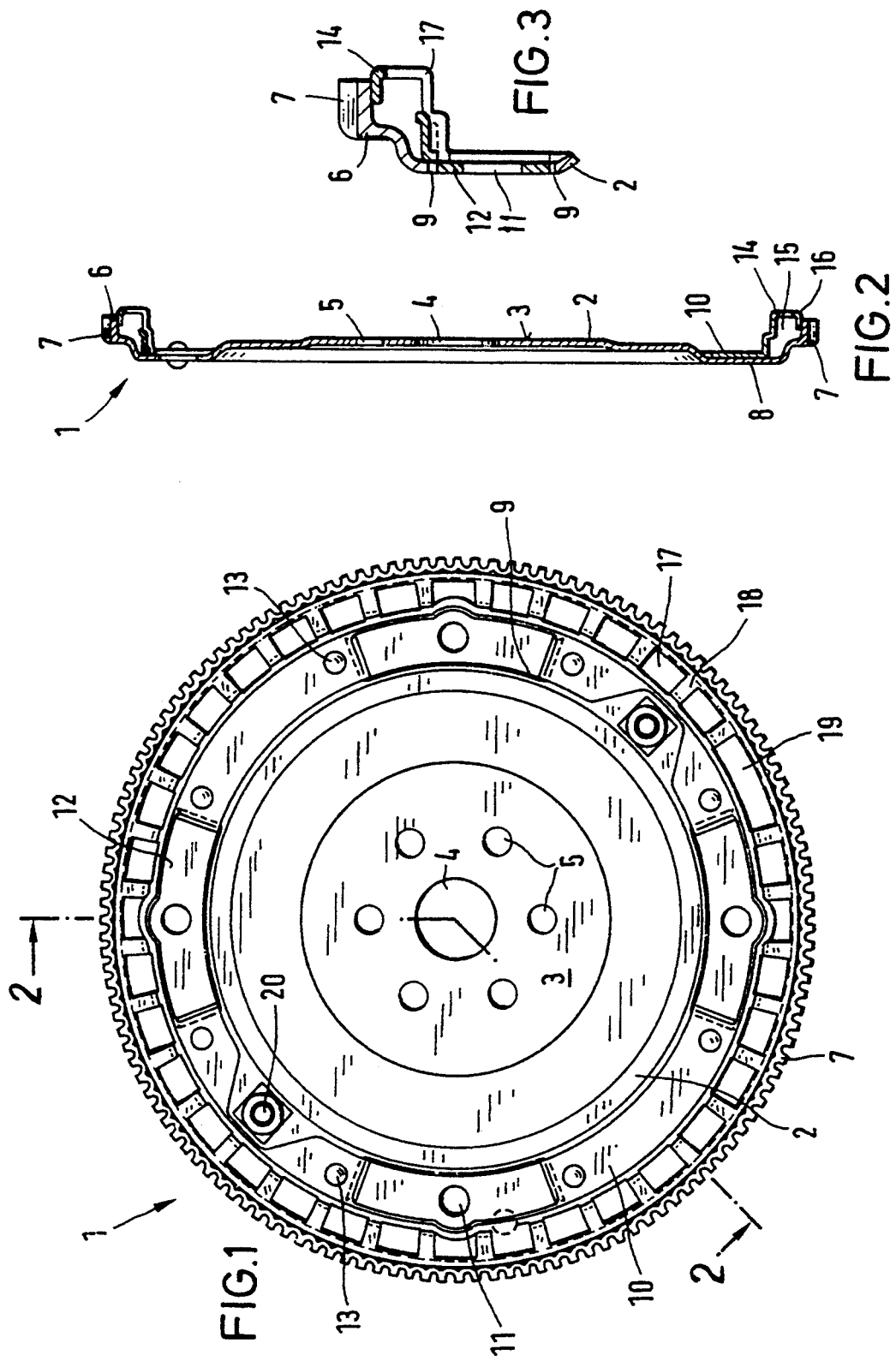

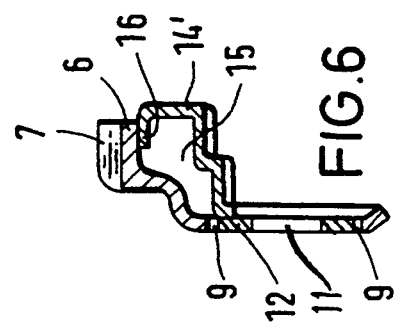
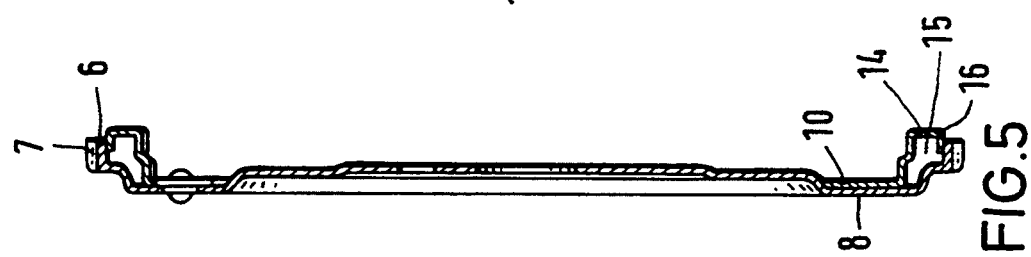
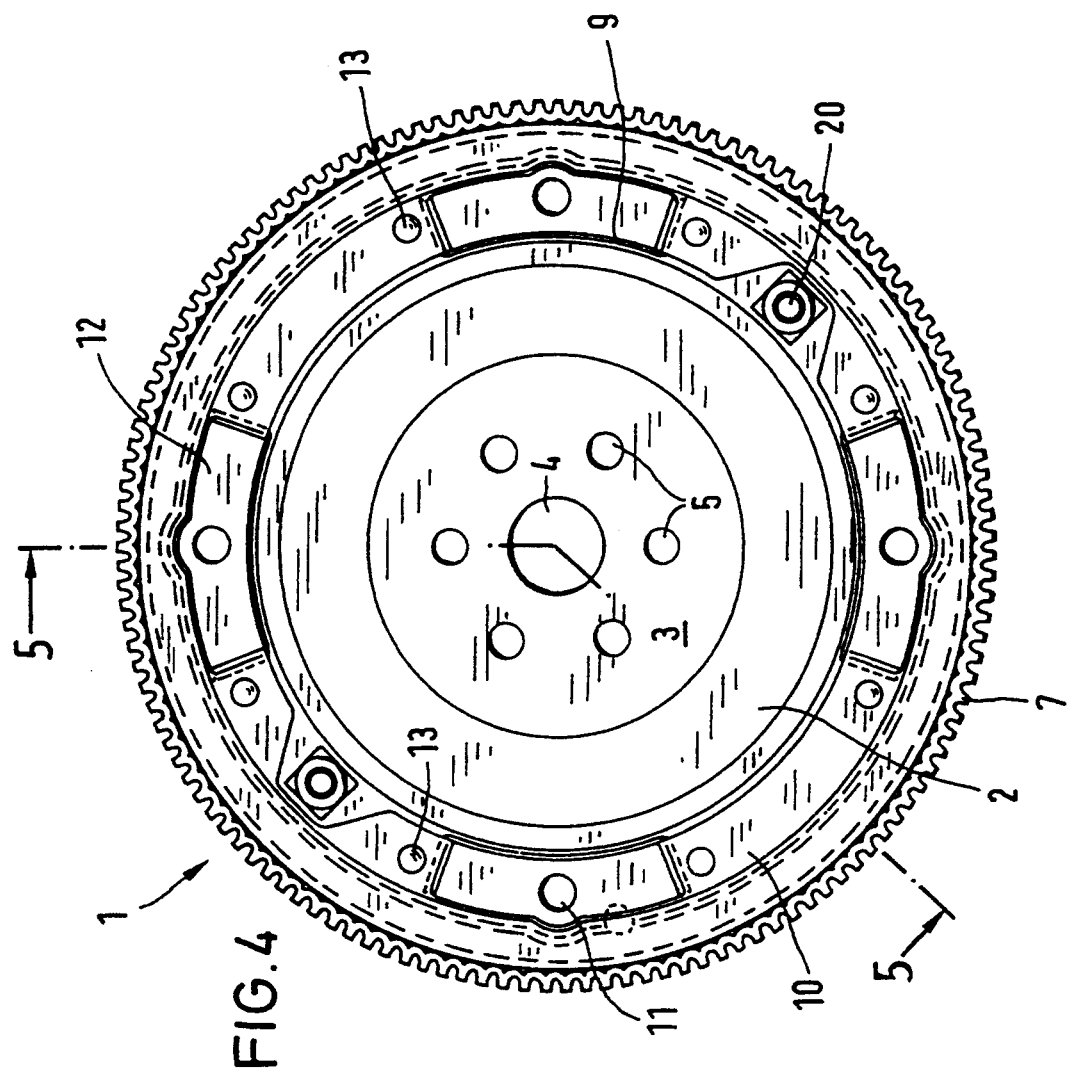

DRIVE GEAR FOR A MOTOR VEHICLE

BACKGROUND OF THE INVENTION

The present invention relates to a drive gear for a motor vehicle or the like having a starter disc with a hub, with which the drive gear is connected to a shaft of a vehicle motor for joint rotation therewith, and a drive ring, which is secured on the starter disc for joint rotation therewith and is connected to a converter of the automatic transmission of the vehicle for joint rotation with he converter.

Such drive gears serve, on one hand, for starting the vehicle motor and, on the other hand, for transmitting the drive force from the motor, via a converter, to the transmission. To this end, the drive ring is bulged outwardly in the region of the openings, which insure its connection to the converter, so that it can take up, in a mounted condition, certain axial and radial forces. The drive ring is formed as a one-piece element and is secured to the starter disc during assembly of the vehicle. The drawback of this known drive gear consists in that, in addition to the assembly costs, the drive ring, because of convexity of the starter disc, has a reduced stability in the region where it is connected to the converter. The reduced stability is compensated by an increased wall thickness, so that the drive ring weight is relatively high. The increased wall thickness leads also to an increased space requirement for the drive ring, which is also a drawback.

To overcome these drawbacks, it was suggested to form the drive gear as a one-piece part in which the toothing was provided directly on drive ring, or as a two-piece part, in which a toothed ring is connected with the drive element. The suggested one-piece drive gear is indeed very rigid and does not lead to increased assembly cost, however, it was found that such rigid drive gear can take up only small translational and rotational forces. With large forces, the hub region of the drive gear cracks and the drive gear need be replaced.

It was further suggested to form the starter disc and the drive element as separate parts with their own hubs. The drawback of this two-part design consists in increased assembly costs, because of necessity to assemble two parts. In addition, such a two-part drive gear has an increased weight. To reduce the weight, both the drive element and the starter disc can be formed with a reduced wall thickness. However, the reduced wall thickness leads to that the starter disc takes up negative vibrations of the vehicle motor.

Accordingly, the main object of the invention is a drive gear which would have a reduced weight, is easy to assemble, requires small mounting space, is operationally reliable, and is flexible with regard to axial forces acting thereon, and which can assume additional functions.

SUMMARY OF THE INVENTION

This and other objects of the invention, which will become apparent hereinafter, are achieved by providing a drive gear the drive element of which has, in the region of the means for connecting the drive element to the converter, protrusions which engage in corresponding openings formed in the starter disc.

According to the invention, there is provided a ring which has a reduced weight, is very rigid, requires a small mounting space and, at the same time, is operationally reliable. The drive gear according to the invention, due to indirect force transmission from the motor to the hub of the starter disc and from the hub to the drive ring supported on the starter disc, has as high axial and radial fatigue strength under reversed bending stresses as the known one-piece drive gear, because axial and radial displacements take place essentially in the region of protrusions of the drive ring, so that the protrusions in the region of the starter ring openings take up these displacements. Despite the possibility of displacement, the drive gear is very stable because the drive ring in this region tightly abuts the starter disc. Simultaneously, these displacements and/or motion forces can be positively influenced by specific shaping of the drive ring. The flatter the protrusions, the more rigid is the part.

Advantageously, the protrusions according to the invention are so formed that their outer surfaces are flush with the adjacent outer surface portions of the starter disk. With this design, the part is especially rigid and requires especially small mounting space in the vehicle. It is especially advantageous when the drive ring is riveted or screwed to the starter ring in the rim region of the starter disc which abuts the protrusions.

In an especially advantageous embodiment of the invention, the drive ring is provided, at its outer circumference, with a substantially U-shaped rim which defines a cavity and has a free leg which engages beneath the starting toothing. Such a design provides an additional and rather unexpected muffling effect, so that additional muffling elements are not needed. Also, the drive gear according to the invention can assume the function of a flywheel, especially when the cavity formed by the U-shaped rim of the drive ring is filled up.

In order to improve the muffling effect and to enable the drive gear assume the additional flywheel function, damping means are provided in the cavity formed by the U-shaped rim between the rim and the starter disc. Alternatively, according to the invention, the U-shaped rim is advantageously provided, at its perimeter, with circumferentially equally spaced holes and a transmitter opening for forming a transmitter profile. This feature enables the drive gear to assume additionally also a transmitter function, without a need in an additional element.

When the drive ring is formed as one-piece with a circular rim, the drive ring has a slot in the region between the rim and each protrusion. By such "free section" of a protrusion, decoupling of the starter disc from axial and radial motive forces of the converter is achieved. Simultaneously, the "free section form", that is the slot width, provides for variability for generating particularly appropriate linear and torsional spring characteristics. To this end, the slot may have in rim regions a larger width, so that protrusions in the transition region have a smaller width then the non-protrusion region of the drive ring.

BRIEF DESCRIPTION OF THE DRAWINGS

The features and objects of the present invention will become more apparent and the invention itself will be best understood from the following detailed description of the preferred embodiments when read with reference to the accompanying drawings, wherein:

FIG. 1 shows a side view of a drive gear according to the invention;

FIG. 2 shows a cross-sectional view along line 2—2 in FIG. 1;

FIG. 3 shows an enlarged detailed cross-sectional view of the rim region of the drive gear;

FIG. 4 shows a view similar to that of FIG. 1 of another embodiment of a drive gear according to the invention;

FIG. 5 shows a cross-sectional view along line 5—5 in FIG. 4;

FIG. 6 shows a view similar to that of FIG. 3 of the drive gear shown in FIG. 4;

DETAILED DESCRIPTION OF THE PREFERRED EMBODIMENTS

Figure 7:
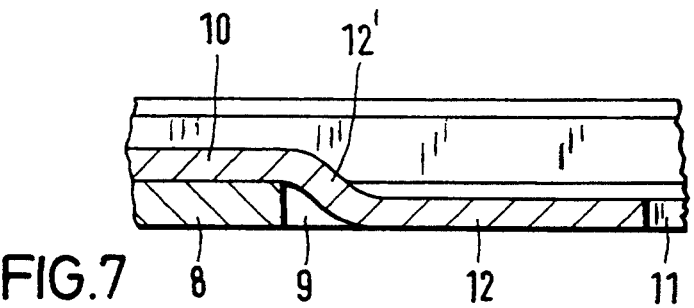
FIG. 7 shows a partial cross-sectional view of one embodiment of protrusions of a drive ring.

The drive gear according to the present invention is designated in the drawings with a reference numeral 1. The drive gear 1 comprises a starter disc 2, which is formed as one piece from a disc-shaped sheet steel blank. The starter disc 2 has a hub region 3 with a central hole 4 for a motor shaft and a plurality of attachment openings 5, which are provided on the perimeter of the hub region for attaching the drive gear 1 to a motor flange. The rim region of the starter disc 2 is formed by a circular web. The web-shaped rim region is designated with a reference numeral 6. This rim region is formed with an integral starting toothing designated with a reference numeral 7. The toothing 7, alternatively, can be formed as a weldable solid ring (rim gear). The toothing 7, during starting of the vehicle, is drivingly connected with a starter pinion. Thereby, when the vehicle motor is started, the motive force is transmitted from the starter pinion (not shown) to the toothing 7 and through the hub 3 to the associated motor. The rim region of the starter disc 2, which is adjacent to the web 6, has a annular disk-shaped portion 8 which is provided with circumferentially equally spaced openings 9. The disk-shaped portion 8 is designed for receiving a drive ring 10. The drive ring 10 serves for transmitting a force to a converter (not shown) of an automatic transmission. To this end, the drive ring 10 is provided with connection means in the form of holes 11 for receiving connecting screws (not shown) which secure the drive ring 10 to a converter flange. In the region of the connecting holes 11, there are provided protrusions 12 which engage in the openings 9 of the starter disc 2, advantageously in such a manner that their outer surface is aligned with the adjacent outer surface of the starter disc 2. In the shown embodiment, there are provided four openings 9 and, respectively, four protrusions 12. Naturally, another number of openings and a corresponding number of protrusions can be used.

In the rim region of each protrusion 12, the drive ring 10 is secured to the starter disc 2 with rivets 13. The openings 9 of the starter disc 2 are formed somewhat larger than the protrusions 12 of the drive ring 10, that is the width of the drive ring 10 in the region of the protrusions 12 is smaller than the width of the openings 9. By such forming of the protrusions 12, decoupling of the starter disc 2 from axial and radial displacement forces of the converter is achieved.

Advantageously, the drive ring 10 is provided, on its outer circumference, with approximately U-shaped rim 14 defining a cavity 14. The free leg 16 of the rim 15 engages beneath the starting toothing 7.

The U-shaped rim 14, in order to form a transmitter profile, is provided with alternating openings 17 and webs 18, wherein a larger opening 19 forms a transmitter cavity for effecting the transmitter function, by virtue of the opening 19 being larger than openings 17, whereby repeated appearances of the opening 19 at a predetermined position defines the number of revolutions of the starter disc. In this embodiment, shown in FIGS. 1-3, the starter disc 2 fulfills, additionally, also function of a transmitter wheel.

In addition, FIG. 1 shows welding nuts 20, which serve for mounting of the drive gear 1.

FIGS. 4-6 show another embodiment of a drive gear according to the invention. In FIGS. 4-6, the same reference numerals are used for designating identical or similar elements. The embodiment shown in FIGS. 4-6 differs form that of FIGS. 1-3 in that U-shaped rim is formed closed, without a transmitting profile, so that its cavity 15 is available for further use. The cavity 15 can, e.g., be filed with damping means to insure an especially good muffling. The muffling effect is obtained, even without additional damping means, also in the embodiment of FIGS. 1-3.

In addition to muffling, the U-shaped rim 14' also serves as a space for additional circular equalizing mass, so that, with appropriate dimensioning of the drive gear 1 for a predetermined case, the drive gear 10 can also serve as a flywheel. To this end, the cavity 15 may be filled with an appropriate mass which would serve not only for muffling but also as a flywheel mass.

Figure 8:
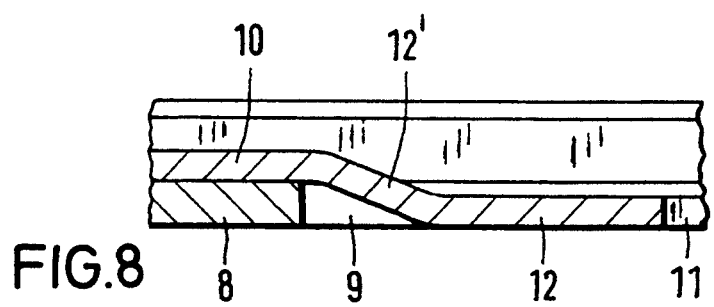
FIG. 8 shows a view similar to that of FIG. 7 of another embodiment of protrusions of the drive rings.

FIGS. 7 and 8 show two different forms of protrusions 12, which differ from each other in that the inclined transitional portions 12a of the protrusions 12 have different ascending gradients. The gradient shown in FIG. 7 is visibly bigger than that shown in FIG. 8. By providing a different ascending gradient, a respective spring rate may be changed. The smaller is the ascending gradient, the more rigid is the drive ring. In this way, in a simple manner, the displacement or the motivity can be adapted to a respective case by appropriate forming the drive ring 10 in the region of protrusions 12.

Figure 9:
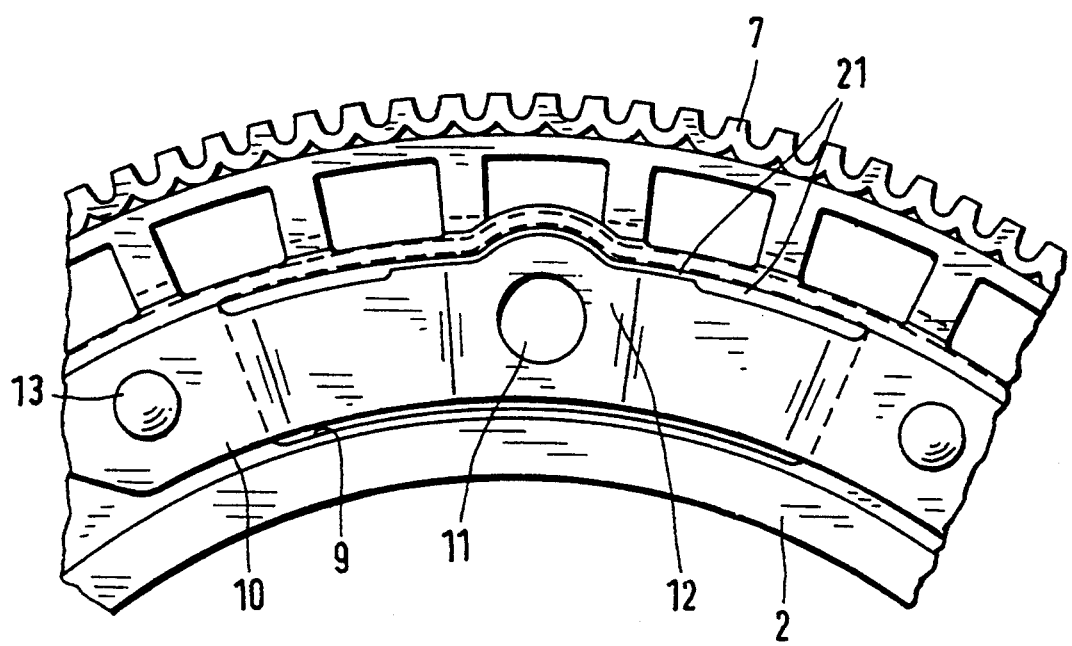
FIG. 9 shows an enlarged side view of a portion of a drive gear according to the invention.

As shown in FIG. 9, the drive ring 10 has in the region between the U-shaped rim 14 and each protrusion 12 a respective slot 21. The slot width is adapted to the respective rims and, generally, is larger in the transition region 12' of the protrusions 12. By this "free section" of the protrusion 12, a compete decoupling of the starter disc from axial and radial displacement forces of the convertor is achieved. Simultaneously, the "free section", that is the width, especially in the transition region 12a, provides for the variability for generating appropriate linear and torsional characteristics. As discussed above, the protrusions 12 are received in respective openings 9 of the dish-shaped portion 8 of the rim region. The mobility of the protrusions 12, which, of course, is very small, in the openings 9, is determined by the length and shape of the transitional region 12' which determines the width of the slot 21. This arrangement insures a certain mobility or springing in axial and radial directions between the starter disc 2 and the converter which is attached to the protrusions 12. Accordingly, by changing the length and the shape of the transitional region 12', the linear and torsional characteristics can be varied.

The drive ring 10 may also be formed without the U-shaped rim 14, e.g., with a formlocking profile, when the drive ring performs no additional functions.

While particular embodiments of the invention have been shown and described, various modifications thereof will be apparent to those skilled in the art and, therefore, it is not intended that the invention be limited to the disclosed embodiments or details thereof, and the departure may be made therefrom within the spirit and scope of the invention as defined in the appended claims.

What is claimed is:

1. A drive gear for a motor vehicle, comprising:
   a starter disc having a hub for attachment to a shaft of a vehicle motor for joint rotation therewith; and
   a drive ring supported on said starter disc and having a plurality of holes for receiving means for connecting said drive ring to a converter of an automatic transmission of the vehicle, said drive ring having, in the region of said holes, protrusions which engage in corresponding recessed openings formed in said starter disc.

2. A drive gear as set forth in claim 1, wherein said protrusions have outer surfaces which are aligned with adjacent portions of an outer surface of said starter disc.

3. A drive gear as set forth in claim 1, wherein said drive ring includes an outer circumference and is provided with a substantially U-shaped rim thereat, said substantially U-shaped ring defining a cavity and having a leg engaging beneath a starting toothing of said starter disc.

4. A drive gear as set forth in claim 3, wherein damping means is located in said cavity between said U-shaped rim and the starter disc.

5. A drive gear as set forth in claim 3, wherein said U-shaped rim includes a perimeter with a plurality of circumferentially spaced openings and a transmitter opening for forming a transmitter profile.

6. A drive gear as set forth in claim 3, wherein drive ring includes a slot between said U-shaped rim and each of said protrusions.

* * * * *